United States Patent [19]

Neuhaeusser et al.

[11] 4,251,177

[45] Feb. 17, 1981

[54] INCLINED ARTICLE STORAGE FRAMES WITH A LOADING AND UNLOADING APPARATUS

[75] Inventors: Horst Neuhaeusser, Danzigerstrasse 116, 7313 Reichenbach, Fed. Rep. of Germany; Ole Storm, Oslo, Norway

[73] Assignee: Horst Neuhaeusser, Reichenbach, Fed. Rep. of Germany

[21] Appl. No.: 902,086

[22] Filed: May 2, 1978

[30] Foreign Application Priority Data

May 2, 1977 [DE] Fed. Rep. of Germany ....... 2719492

[51] Int. Cl.³ ............................................. B65G 65/00
[52] U.S. Cl. ................................... 414/276; 198/347; 221/90; 414/609; 414/639
[58] Field of Search ................ 414/222, 227, 229–230, 414/258, 264, 266–268, 276–277, 279, 281, 283, 592, 605, 609, 639, 669–670; 198/347; 221/90

[56] References Cited

U.S. PATENT DOCUMENTS

| 312,616 | 2/1885 | Eccles | 414/592 |
|---|---|---|---|
| 1,288,567 | 12/1918 | Hall | 414/258 |
| 3,157,296 | 11/1964 | Oldham | 414/277 |
| 3,394,823 | 7/1968 | Fraser | 414/258 |
| 3,407,926 | 10/1968 | Rosser | 414/276 |
| 3,905,496 | 9/1975 | Reeder | 414/592 |

FOREIGN PATENT DOCUMENTS

| 556340 | 8/1932 | Fed. Rep. of Germany | 414/258 |
|---|---|---|---|
| 1456379 | 3/1969 | Fed. Rep. of Germany | 414/592 |
| 1124905 | 7/1956 | France | 414/258 |
| 881380 | 11/1961 | United Kingdom | 414/252 |
| 1409913 | 10/1975 | United Kingdom | 221/90 |

Primary Examiner—Stephen G. Kunin
Assistant Examiner—R. B. Johnson
Attorney, Agent, or Firm—Schwartz, Jeffery, Schwaab, Mack, Blumenthal & Koch

[57] ABSTRACT

An article handling device is adapted for storing and readying cassettes, film cards and other information carriers of essentially equal size. The device comprises a support frame including a plurality of compartments for accepting articles to be stored, these compartments being arranged in vertically oriented rows of generally aligned, opposing pairs of compartments, with the rows being spaced apart from one another to define a passageway between the rows, each compartment having an inclined floor member, with the floor members of each compartment pair being inclined outwardly away from the passageway; and apparatus for selectively inserting an article into one of the compartments, comprising a lifting assembly which is vertically displaceable in the passageway and an article carrier mounted on the lifting assembly such that the carrier is tiltable from the horizontal position bilaterally to an angle which is parallel to the inclined floor member of either compartment of a compartment pair.

13 Claims, 7 Drawing Figures

INCLINED ARTICLE STORAGE FRAMES WITH A LOADING AND UNLOADING APPARATUS

BACKGROUND OF THE INVENTION

The invention pertains to a storage device for readying of information carriers substantially equal in size, particularly cassettes and film cards. The device comprises a storage part with compartments arranged above each other in vertical columns and adjacent to each other in horizontal rows, each compartment serving to store one information carrier and having an inclined bottom comprising fittings to secure the information carrier against sliding out, as well as a discharge and insertion device.

A storage device of this type is known from DEOS No. 2,349,406.6, in which the shelves are arranged in the form of double shelves in pairs with facing discharge directions and a common discharge shaft is provided through an arrangement of vertical sheet metal parts for the opposing columns of compartments of a double set of shelves. On the external sides of the double sets of shelves, an insertion device is arranged, which essentially consists of a displaceable shaft chamber which in turn contains a device for the positioning of cassettes for insertion in the inclined compartments. The positioning device may comprise a revolving transport band with stud divisions or swivelling slide flaps in combination with braking flaps. The device described in the principal patent requires a substantial expenditure with respect to design and control technology because each of the opposing shelves of the double set of shelves needs a separate insertion device on the outside of the shelves, with a corresponding complete control device to position the compartments. The positioning device of the invention of the principal patent also requires a considerable structural outlay. In addition, the feed transport band of the insertion device and the discharge transport band leading from the discharge shafts must be arranged (viewed spatially) above or below the shelf parts, thus requiring their own structural height, together with additional space.

SUMMARY OF THE INVENTION

The object of the present invention is the creation of a storage device with reduced structural, technical control and space requirements.

The invention resides in the fact that the storage parts are arranged with outwardly pointing discharge directions in pairs while forming between them a passageway for the insertion mechanism and in the fact that the insertion device consists of a horizontally displaceable lifting frame, on which is arranged a tilting carrier, which is tiltable from the horizontal position bilaterally into positions corresponding to the inclined position of the inclined storage bottoms.

The invention provides a storage device having only one insertion device for every two shelf units, which cuts in half the high expense for control devices to vertically and horizontally position the cassettes during their insertion, when compared with the storage device of the principal patent. The cost of the discharge devices, which consist essentially of drop shafts and a transport belt, is relatively low. The storage device therefore requires a lower design height.

The lifting frame is advantageously formed by a carrier plate movable on rollers in tracks, and the tilting carrier is formed by a carrier pocket and a spring-loaded dual armed lever, both supported on a common axis on the carrier plate, whereby the lever arms of the dual lever, in cooperation with the respective releasable stops of the compartments, effect the tilting motion of the carrier pockets in the one or the other direction and the spring causes the return of the dual lever, and thus brings the carrier pockets into the horizontal position, when the releasable stops are withdrawn. The insertion device designed in this manner is extraordinarily simple from a structural standpoint and renders possible the simple and accurate moving to the compartments and the positioning of the cassettes for their sliding into the compartments. The releasable stops conveniently consist of magnetically controlled bolts, which are contacted by the dual lever during positioning in the inclined position necessary for the sliding out of the cassettes with the simultaneous rotation of the carrier pocket, whereby, the dual lever or the carrier pocket may simultaneously serve as the actuating member for a positioning transmitting switch controlling the lift motor. The return or holding spring may be formed in a particularly simple manner by a leaf spring fastened at one end to the dual lever and slidingly guided at its free end between pins. The carrier pocket conveniently also serves to automatically receive the cassettes from the loading transport band, for which purpose the bottom part of the pocket is arranged hingedly on the part attached to the lift frame and provided with a closing lever, which is directed downwardly and moves on a guide track. The closing lever moves beyond the guide track upon reaching the receiving position in front of the loading transport belt, thus releasing the outer wall to rotate into the plane of the transport belt. In an embodiment particularly advantageous for this purpose, the carrier pocket is limited on the outside by a fork-like frame with its tines slightly curved toward the outside, said frame having dimensions coordinated with those of the loading transport belt so that it embraces the loading transport belt on both sides, thus gripping the oncoming cassette bilaterally.

BRIEF DESCRIPTION OF THE DRAWINGS

The invention is illustrated in the drawing with the aid of an exemplary embodiment. In the drawings.

DETAILED DESCRIPTION OF PREFERRED EMBODIMENTS

Figure 2:
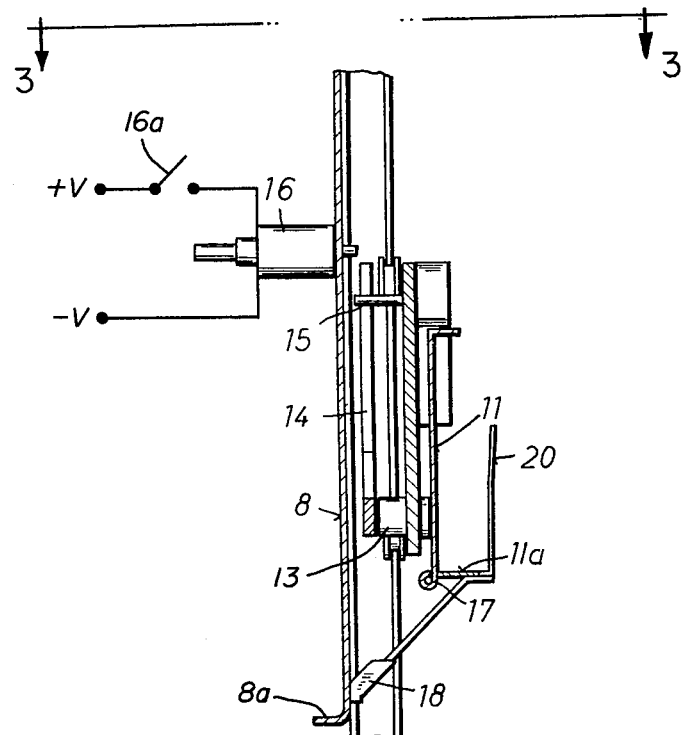
FIG. 2 is a side view of the lift frame in the travelling position taken along line 2—2 of FIG. 3.
Figure 3:
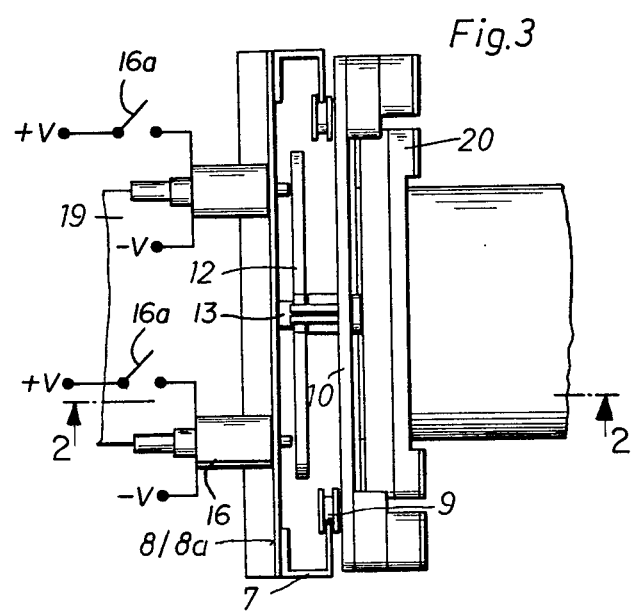
FIG. 3 is a top view of the lift frame taken along line 3—3 of FIG. 2.
Figure 5:
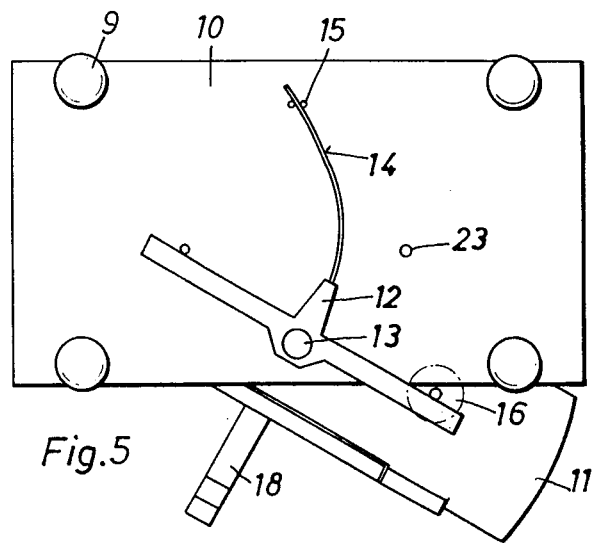
FIG. 5 is a view in the slide-out position of the carrier pocket corresponding to FIG. 4.
Figure 4:
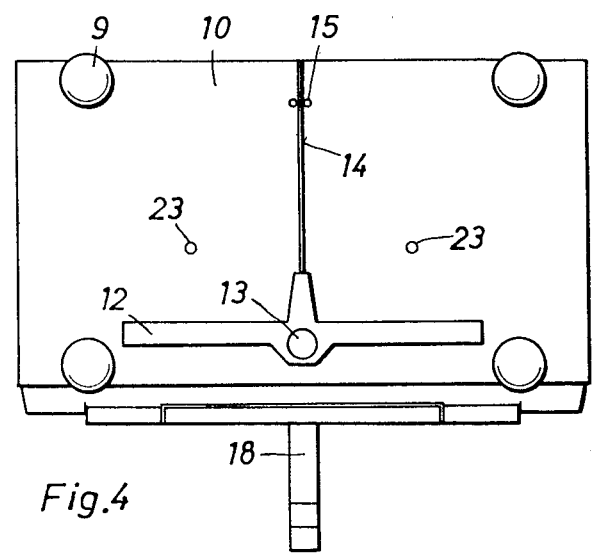
FIG. 4 is a rear view of the lift frame.
Figure 7:
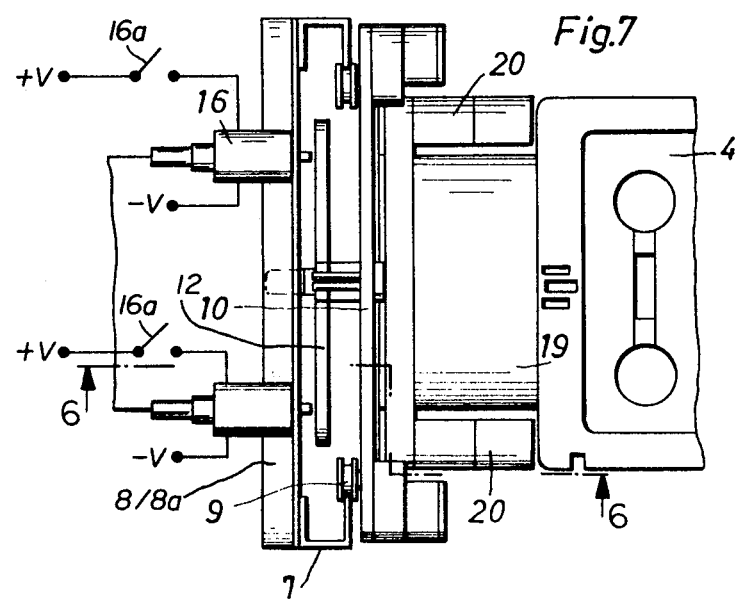
FIG. 7 is a top view taken along line 7—7 of of FIG. 6.

In the drawing, 1 and 2 indicate storage shelves with compartments 3 for storing cassettes 4. The compartments are in an inclined position, thus allowing the automatic sliding in and out of the cassettes. The shelves are arranged in pairs with their direction of discharge pointing toward the outside, while forming a passageway 5 between them. An insertion device of the rack transport device type moves in said passageway. The insertion device consists of a support frame movable on rollers 6, which frame is comprised of a frame support plate 8 (FIG. 2) with U-shaped tracks 7 arranged on it. The U-shaped tracks have openings opposing each other (FIGS. 3 and 7) and serve to guide the lift frame. The lift frame consists of a carrier plate 10 guided on the legs of U-shaped tracks 7 by rollers 9. A tilting article carrier, formed by a carrier pocket 11 (FIG. 2) and a spring-loaded dual lever 12 (FIGS. 4 and 5), is supported by said carrier plate 10. Carrier plate 10 and rollers 9 form a lifting assembly. The carrier pocket 11 and the tilting lever 12 are supported on a common axis 13 in the carrier plate 10, so that the carrier pocket 11 is located on one side and the dual lever 12 on the other side of the carrier plate 10. A leaf spring 14 is provided to secure the carrier pocket 11 in the horizontal position and also to return the carrier pocket to the horizontal position. The spring is fastened on one end to the dual lever 12 and is slidingly guided with its free end between pins 15. Further, stop pins 23 are mounted on the carrier plate 10 (FIGS. 4 and 5) to limit the tilting motion of the dual lever 12 and thus of the carrier pocket 11. The stop pins may simultaneously serve as position transmission switches to terminate the lifting movement of the lift frame by a lift motor 27 which drives a drum 28 on which is wound a cable 29 connected to carrier plate 10. The frame support plate 8 further carries in the plane of each cassette compartment two electrically controllable, magnetically actuated release bolts 16, which travel with the lift frame and cooperate with the dual lever 12 so that, in order to insert the cassettes, the stop bolt associated with the desired loading position is disengaged and is then struck by the dual lever 12 with its corresponding leg during the lift movement of the carrier plate 10, while the carrier pocket 11 is rotated until the other leg of the dual lever strikes the corresponding stop pin 23. Each stop pin 23 may be coupled to actuate a switch 23a for stopping lift motor 27. The carrier pocket then occupies a position in which its bottom represents an extension of the inclined bottom of the compartment.

Figure 6:
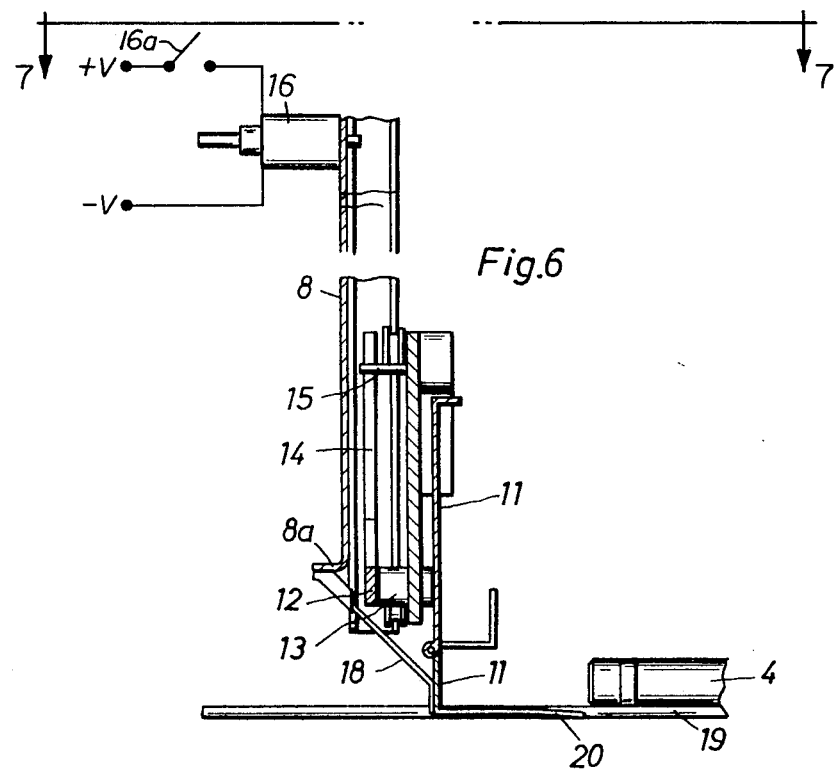
FIG. 6 is a view in the receiving position of the carrier pocket corresponding to FIG. 2 and taken along line 6—6 of FIG. 7.

The bottom wall 11a of the carrier pocket is mounted hingedly, by means of the hinge 17, on the part 11 of the pocket fastened to the lift frame and is equipped with a downwardly directed closing lever 18. The closing lever travels in the case of the present example on a slide path formed by the frame support plate 8, until it moves beyond the range of the slide path upon reaching the receiving position for the cassettes, in front of the loading transport belt 19, thus releasing the bottom part 11a and simultaneously with it the outer confining member of the carrier pocket for rotation into the plane of the transport belt. For this purpose the frame carrier plate 8 has a bent configuration at its lower end 8a. In the case of this example, the outer confining member of the carrier pocket is formed by a fork-line frame, with its tines 20 (FIGS. 2, 6 and 7) curving slightly to the outside and with dimensions coordinated with those of the loading transport belt 19 and the cassettes 4, so that tines 20 of the forklike frame lie substantially in the plane of and on respective opposing sides of the loading transport belt so as to receive and support the oncoming cassette opposing edges of the cassette. In this manner, a pick-up device for cassettes has been created which is extraordinarily simple in its design and very safe in its operation.

Further, on the outside of the shelves 1, discharge drop shafts 21 are provided for the cassettes. The shafts conduct each cassette discharged to the discharge transport belt 22, where the cassettes are released in a known manner, for example as described in the principal patent, or in another known manner.

For example, a hinged ramp member 32 may be provided in the floor of each compartment and a stop 33 in the upper wall of the compartment for holding the cassette. Selectively lowering ramp member 32 by any suitable means allows the cassette to slide out of the compartment.

Figure 1:
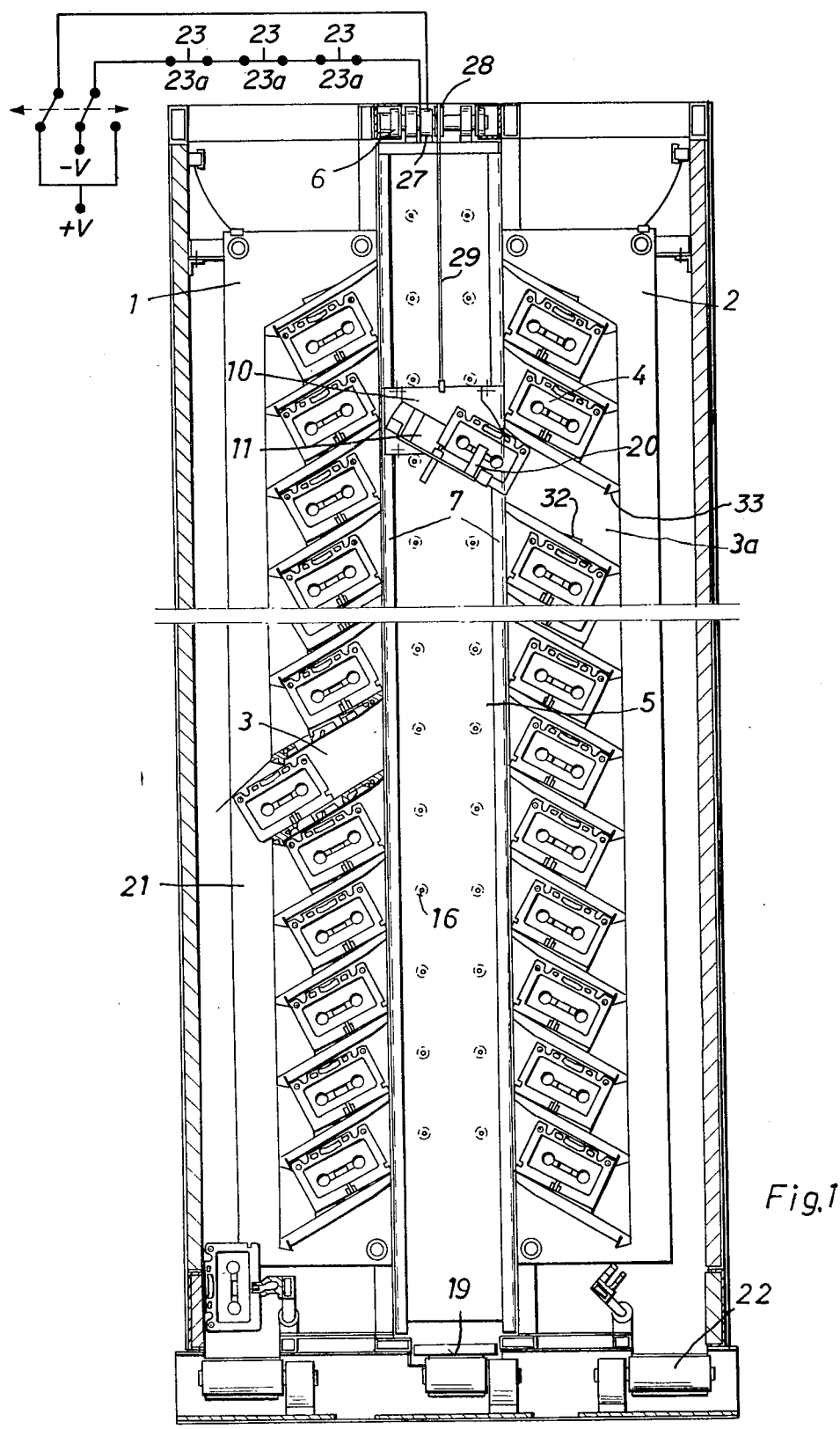
FIG. 1 is a side view of a dual set of shelves with an insertion and a discharge device.

The device of the invention operates as follows:

To insert the cassette, the lift frame 10, 11, 12 is moved into the plane of the transport belt 19, while the closing lever 18 slides along the frame carrier plate 8, until it reaches the lower end 8a (FIG. 6) where it leaves the vertical slide rail. As a result, the carrier pocket bottom 11a and the outer confining member of the carrier pocket formed by the tines 20 rotate into the position shown in FIGS. 6 and 7, where the tines 20 embrace the transport belt 19. The cassette 4 transported here by the transport belt strikes against the bottom 11a of the carrier pocket and is thus arrested. During the subsequent ascent of the lift frame 10, the closing lever 18 slides onto the vertical part of the slide path formed by the frame support plate 8 and closes the carrier pocket. Simultaneously, the compartment intended to receive the cassette (in the case of FIG. 1, Compartment 3a) has been lined up by moving the corresponding stop bolt 16 into the path of the dual lever 12 by selectively closing the associated switch 16a, for example. Upon the ascent of the carrier plate 10, the dual lever 12 strikes the stop bolt 16 and is rotated, with attendant tensioning of the spring 14, until the other arm of the lever strikes the pin 23. The carrier pocket 11 now occupies the position shown in FIGS. 5 and 1, in which the cassette slides into the intended compartment. Following completion of the loading process, the stop bolt 16 is withdrawn by deenergizing of the control magnet, whereupon the spring that has been placed under tension during the rotation, returns to its extended position by sliding upwardly between the guide pins 15. This results in the simultaneous return of the dual lever 12 and the carrier pocket 11 into their horizontal position. The insertion device is now ready for the next loading process, in which insertion may take place at any location of the belt, because of the design of the outer confining member of the carrier pocket as a dual fork.

What is claimed is:

1. An article storage device adapted for storing and readying cassettes, film cards and other information carriers of essentially equal size, comprising:
   a support frame including a plurality of compartments for accepting articles to be stored, said compartments being arranged in vertically oriented rows of generally aligned, opposing pairs of compartments, said rows being spaced apart from one another to define a passageway therebetween, each compartment having an inclined floor member, with the floor members of each compartment pair being inclined outwardly away from said passageway; and
   movable means mounted on said support frame for selectively inserting an article into one of said compartments, comprising a lifting assembly which is vertically displaceable in said passageway and an article carrier pivotally mounted on said lifting assembly in such a manner that the carrier is tiltable from a horizontal position bilaterally to an angle which is parallel to the inclined floor member of either compartment of a compartment pair;

wherein said movable means comprises a vertical support plate and a pair of parallel tracks mounted vertically on said support plate, wherein said lifting assembly comprises a carrier plate and a plurality of rollers mounted on said carrier plate for engaging said tracks, whereby said carrier plate is vertically displaceable with respect to said support plate, and wherein said article carrier comprises a carrier pocket defined by a bottom wall generally perpendicular to said carrier plate and an outer confining member generally parallel to said carrier plate, a dual-armed lever and means for biasing said lever into a normally horizontal position, said carrier pocket and said lever being supported on a common axis attached to said carrier plate, said article storage device further comprising a selectively activatable stop member mounted on said support plate adjacent to and at the lever of each compartment, located such that each stop member in its activated position lies in the path of vertical movement of one of the arms of said lever, whereby movement of said lever into contact with one of said activated stop members causes tilting of said carrier pocket, and withdrawal of said lever from said stop member results in said carrier pocket reassuming its normal horizontal position due to the action of said biasing means.

2. The device as defined by claim 1, wherein each of said compartment floor members includes means for selectively holding an article from sliding out of said compartment.

3. The device as defined by claim 1, wherein said biasing means comprises a pair of spaced pins attached to said carrier plate and a leaf spring attached to said tilting lever and extending in sliding relationship between said pins.

4. The device as defined by claim 1, wherein said selectively activatable stop members comprise magnetically activatable pins.

5. The device as defined by claim 4, further comprising means for selectively moving said carrier plate vertically to a selected compartment, said moving means including an automatic means for stopping vertical movement when said carrier pocket reaches its fully tilted position.

6. The device as defined by claim 5, wherein said automatic stopping means includes said lever, functioning as a position control switch.

7. The device as defined by claim 5, wherein said automatic stopping means includes said carrier pocket, functioning as a position control switch.

8. The device as defined by claim 5, further comprising means, including pins attached to said carrier plate, for limiting the tilting motion of said lever.

9. The device as defined by claim 8, wherein said automatic stopping means includes said pins, functioning as position control switches.

10. An article storage device adapted for storing and readying cassettes, film cards and other information carriers of essentially equal size, comprising:

a support frame including a plurality of compartments for accepting articles to be stored, said compartments being arranged in vertically oriented rows of generally aligned, opposing pairs of compartments, said rows being spaced apart from one another to define a passageway therebetween, each compartment having an inclined floor member, with the floor members of each compartment pair being inclined outwardly away from said passageway; and movable means mounted on said support frame for selectively inserting an article into one of said compartments, comprising a lifting assembly which is vertically displaceable in said passageway and an article carrier pivotally mounted on said lifting assembly in such a manner that the carrier is tiltable from a horizontal position bilaterally to an angle which is parallel to the inclined floor member of either compartment of a compartment pair, wherein said movable means comprises a vertical support plate and a pair of parallel tracks mounted vertically on said support plate, wherein said lifting assembly comprises a carrier plate and a plurality of rollers mounted on said carrier plate for engaging in said tracks, whereby said carrier plate is vertically displaceable with respect to said support plate, wherein said article carrier comprises a carrier pocket defined by a bottom wall generally perpendicular to said carrier plate and an outer confining member generally parallel to said carrier plate, a dual-armed lever and means for biasing said lever into a normally horizontal position, said carrier pocket and said lever being supported on a common axis attached to said carrier plate, and wherein said bottom wall is hingedly connected with respect to said carrier plate, and said device further comprises a downwardly directed closing lever attached to said bottom wall, said closing lever being slidably abutting against said support plate to hold said bottom wall in a closed position generally perpendicular to said carrier plate when said carrier pocket is in an unloading position adjacent to one of said compartments and being out of contact with said support plate when said carrier pocket is in a loading position vertically displaced from the unloading position, whereby said bottom wall rotates into an open position.

11. The device as defined by claim 10, wherein said bottom wall rotates into a substantially vertical position in the loading position.

12. The device as defined by claim 11, further comprising means, including a horizontally oriented article transporting belt located at the loading position, for supplying articles to be stored.

13. The device as defined by claim 12, wherein said outer confining member of said carrier pocket comprises a fork-like frame having tines which are spaced apart at least as widely as the width of said transporting belt and which are bent outwardly at their distal ends.

* * * * *